United States Patent
Li et al.

(10) Patent No.: US 9,965,108 B2
(45) Date of Patent: May 8, 2018

(54) SIMULTANEOUS SELF- AND MUTUAL CAPACITANCE SENSING

(71) Applicant: Apple Inc., Cupertino, CA (US)

(72) Inventors: Yingxuan Li, Saratoga, CA (US); Weijun Yao, San Jose, CA (US); Hyunwoo Henry Nho, Stanford, CA (US); Wei Hsin Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/279,692

(22) Filed: May 16, 2014

(65) Prior Publication Data
US 2015/0331535 A1    Nov. 19, 2015

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01)

(58) Field of Classification Search
CPC .............................. G06F 3/0416; G06F 3/044
USPC ........................................................ 345/173
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Yuzhen Shen
(74) *Attorney, Agent, or Firm* — Morrison & Foerster LLP

(57) ABSTRACT

A touch controller. The touch controller can include first sense circuitry configured to be coupled to a first electrode on a touch sensor panel, the first sense circuitry configured to sense a first self-capacitance associated with the first electrode, and a first mutual capacitance associated with the first electrode. In some examples, the first sense circuitry can be configured to sense the first self-capacitance and the first mutual capacitance simultaneously. In some examples, the touch controller can further include a first mixer and a second mixer coupled to the first sense circuitry, the first mixer configured to demodulate a first output from the first sense circuitry to extract information about the first self-capacitance from the first output, the second mixer configured to demodulate the first output from the first sense circuitry to extract information about the first mutual capacitance from the first output.

17 Claims, 7 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0197753 A1 | 9/2006 | Hotelling |
| 2008/0309625 A1* | 12/2008 | Krah ............... G06F 3/041 345/173 |
| 2012/0287078 A1 | 11/2012 | Lin et al. |
| 2013/0154996 A1 | 6/2013 | Trend et al. |
| 2013/0285971 A1 | 10/2013 | Elias et al. |
| 2013/0285973 A1* | 10/2013 | Elias ............... G06F 3/044 345/174 |
| 2013/0328828 A1 | 12/2013 | Tate |
| 2014/0327644 A1* | 11/2014 | Mohindra ......... G06F 3/044 345/174 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

SIMULTANEOUS SELF- AND MUTUAL CAPACITANCE SENSING

FIELD OF THE DISCLOSURE

This relates generally to touch sensor panels, and more particularly to touch sensor panels in which self-capacitance and mutual capacitance are sensed.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Additionally, some capacitive touch sensor panels can be formed by rows and columns of substantially transparent conductive lines made of materials such as ITO, and can similarly form touch screens with touch sensing circuitry partially integrated into a display pixel stackup. Touch events can be sensed on the above touch sensor panels by detecting changes in the self-capacitance and/or mutual capacitance of the above conductive plates and/or lines. In some examples, the touch sensor panels can simultaneously sense self-capacitance and mutual capacitance. In some examples, one or more capacitances can cause offsets in the self-capacitance measurements that can reduce the dynamic range of corresponding sensing circuits, and can make touch detection difficult. The examples of the disclosure provide various techniques for reducing the offset effects of such capacitances.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Additionally, some capacitive touch sensor panels can be formed by rows and columns of substantially transparent conductive lines made of materials such as ITO, and can similarly form touch screens with touch sensing circuitry partially integrated into a display pixel stackup. Touch events can be sensed on the above touch sensor panels by detecting changes in the self-capacitance and/or mutual capacitance of the above conductive plates and/or lines. In some examples, the touch sensor panels can simultaneously sense self-capacitance and mutual capacitance. In some examples, one or more capacitances can cause offsets in the self-capacitance measurements that can reduce the dynamic range of corresponding sensing circuits, and can make touch detection difficult. The examples of the disclosure provide various techniques for reducing the offset effects of such capacitances.

Figure 1A:
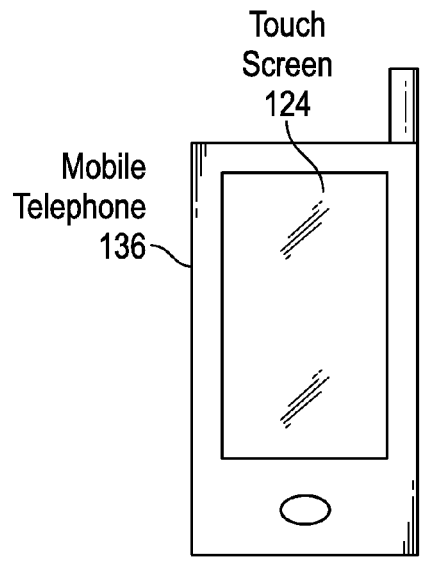
FIGS. 1A-1D illustrate an example mobile telephone, an example media player, an example personal computer and an example tablet computer that can each include an exemplary touch screen according to examples of the disclosure.
Figure 1B:
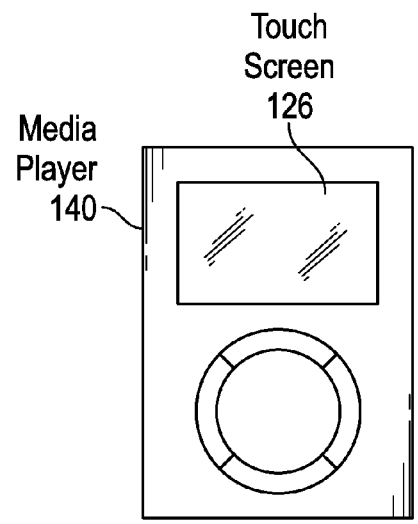
Figure 1C:
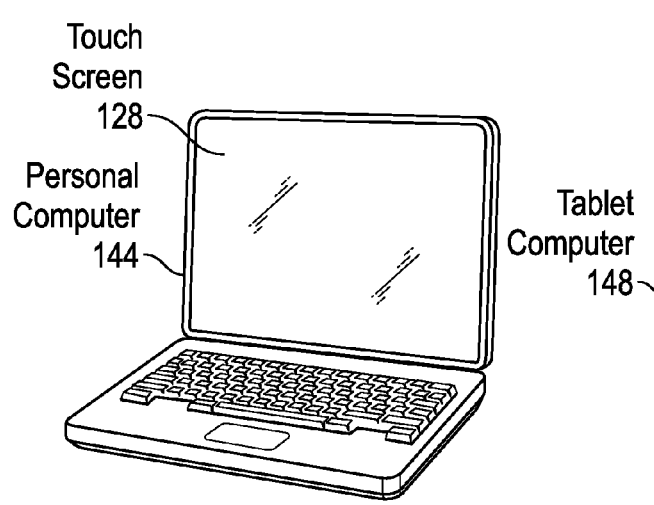
Figure 1D:
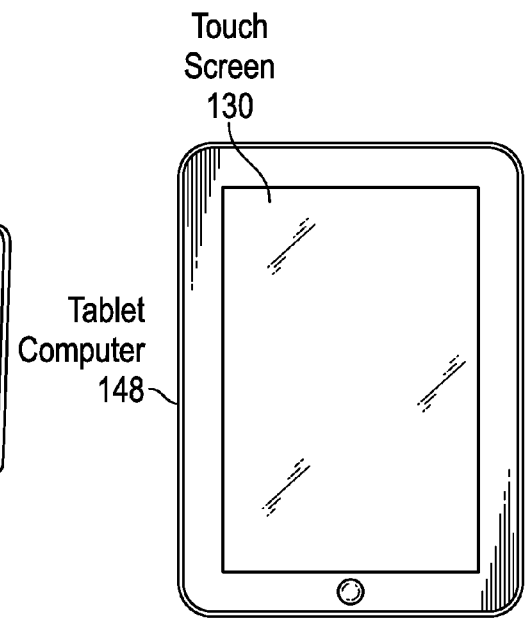

FIGS. 1A-1D show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. Touch screens 124, 126, 128 and 130 can be based on mutual capacitance and/or self-capacitance, as will be described in more detail below, and can be implemented in other devices including in wearable devices.

Figure 2:
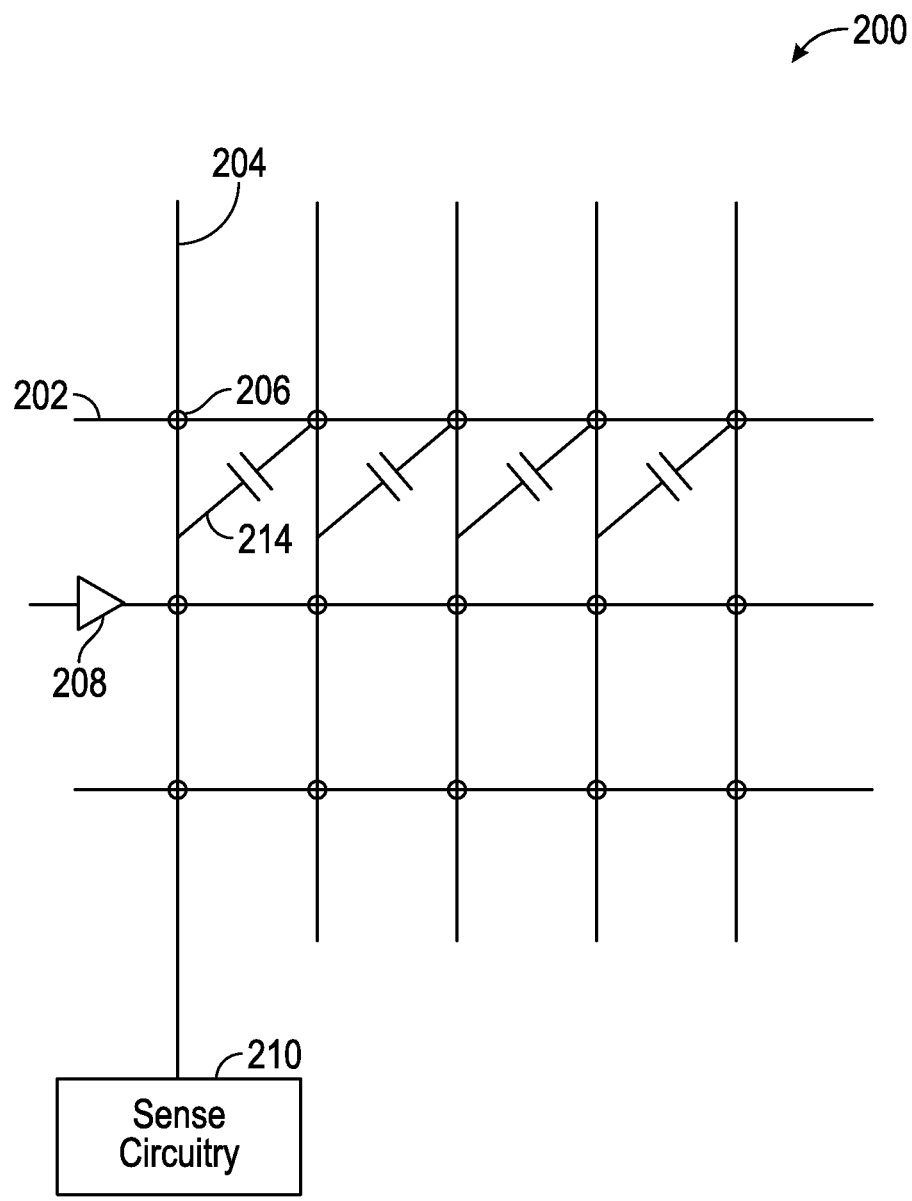
FIG. 2 illustrates an exemplary mutual capacitance touch sensor panel according to some examples of the disclosure.

FIG. 2 illustrates an exemplary mutual capacitance touch sensor panel 200 according to some examples of the disclosure. Touch sensor panel 200 can include an array of touch nodes 206 that can be formed by a two-layer electrode structure separated by a dielectric material, although in some examples the electrodes can be formed on the same layer. One layer of electrodes can include a plurality of drive lines 202 positioned perpendicularly to another layer of electrodes comprising a plurality of sense lines 204, with each of the nodes 206 having an associated mutual capacitance 214 (also referred to as coupling capacitance). It is noted that in some examples, the drive 202 and sense lines 204 can be positioned in non-orthogonal arrangements. The drive lines 202 and sense lines 204 can cross over each other, as illustrated. Each point at which a drive line 202 intersects a sense line 204 can correspond to a touch node 206.

Drive lines 202 (also referred to as rows, row traces, or row electrodes) can be activated by a stimulation signal provided by respective drive circuits 208. Each of the drive circuits 208 can include an alternating current (AC) or unipolar pulsatile voltage source referred to as a stimulation signal source. To sense touch events on the touch sensor panel 200, one or more of the drive lines 202 can be stimulated by the drive circuits 208. As an object approaches a node 206, some of the charge being coupled between the row 202 and column 204 of the node can instead be coupled onto the object. This reduction in charge coupling across the node 206 can result in a net decrease in the mutual capacitance 214 between the row 202 and the column 204, and a reduction in the AC waveform being coupled across the node. The sense circuitry 210 can detect the resulting change in the charge coupled onto the sense lines 204 in the form of a change in the amplitude of the coupled stimulation signal. The change in voltage amplitude values can be indicative of a finger or conductive object touching or in proximity to the panel. The detected voltage values can be representative of touch node output values, with changes to those output values indicating the node location(s) where the touch or proximity events occur, and the amount of touch that occurs at those location(s). An "image" of touch can thus be captured.

Figure 3:
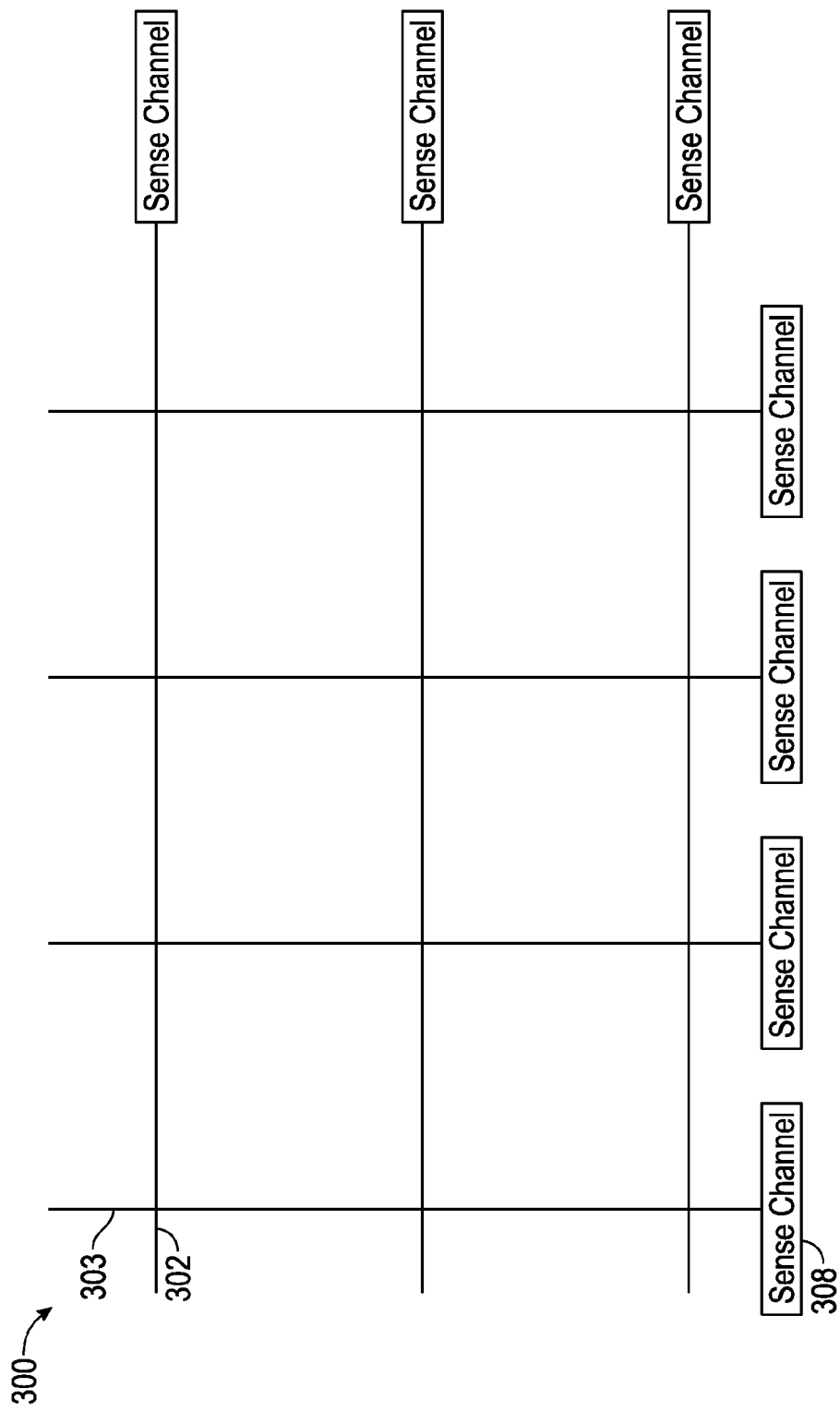
FIG. 3 illustrates an exemplary self-capacitance touch sensor panel having row and column electrodes, and sense channels, according to examples of the disclosure.

FIG. 3 illustrates an exemplary self-capacitance touch sensor panel 300 having row 302 and column 303 electrodes, and sense channels 308, according to examples of the disclosure. Row 302 and column 303 electrodes can be coupled to sense channels 308, which can, in some examples, be included in a touch controller. Row 302 and column 303 electrodes can each have a self-capacitance to ground. During operation of touch sensor panel 300, row 302 and column 303 electrodes can be driven by stimulation signals from sense channels 308, and the self-capacitance of the row and column electrodes can be sensed by the sense channels. Specifically, when an object touches or is in close proximity to row 302 and/or column 303 electrodes, an additional capacitance can be formed between the respective electrodes and ground through the object, which can increase the self-capacitance of the respective electrodes. This change in the self-capacitance of the row 302 and/or column 303 electrodes can be detected by sense channels 308. An "image" of touch can thus be captured.

Though described above as touch sensor panels, it is understood that in some examples, mutual capacitance touch sensor panel 200 and/or self-capacitance touch sensor panel 300 can be integrated with a display to form integrated touch and display touch screens (whether mutual capacitance or self-capacitance). Thus, in some examples, at least some touch sensing circuitry (e.g., row 202, row 302, column 204, and/or column 303) can be integrated with at least some display circuitry such that the touch sensing circuitry can be formed of one or more display pixels. The discussion that follows will be in terms of touch sensor panels, but the examples of the disclosure can similarly be implemented as integrated touch and display touch screens.

Additionally, though the touch sensors of the above touch sensor panels have been described as being rows and columns, this need not be the case, and the examples of the disclosure can similarly be implemented with touch sensors having configurations other than rows and columns.

In some examples, a touch sensor panel can be configured to perform both mutual capacitance touch sensing and self-capacitance touch sensing to produce an "image" of touch with more information than might otherwise be obtained through mutual capacitance or self-capacitance touch sensing alone. In some examples, these two types of touch sensing can be performed sequentially. In some examples, these two types of touch sensing can be performed simultaneously. Performing mutual capacitance touch sensing and self-capacitance touch sensing simultaneously as opposed to sequentially can save touch time, as there may no longer be a need to have separate mutual capacitance and self-capacitance sensing periods. Further, in some examples of the disclosure, power and area can be saved as there may no longer be a need to have separate drive circuitry (which was described above as being used to stimulate drive lines in mutual capacitance sensing) and sense circuitry (which was described above as being used to sense either changes in mutual capacitance or self-capacitance). The examples that follow provide for simultaneous sensing of mutual capacitance and self-capacitance on a touch sensor panel.

Figure 4:
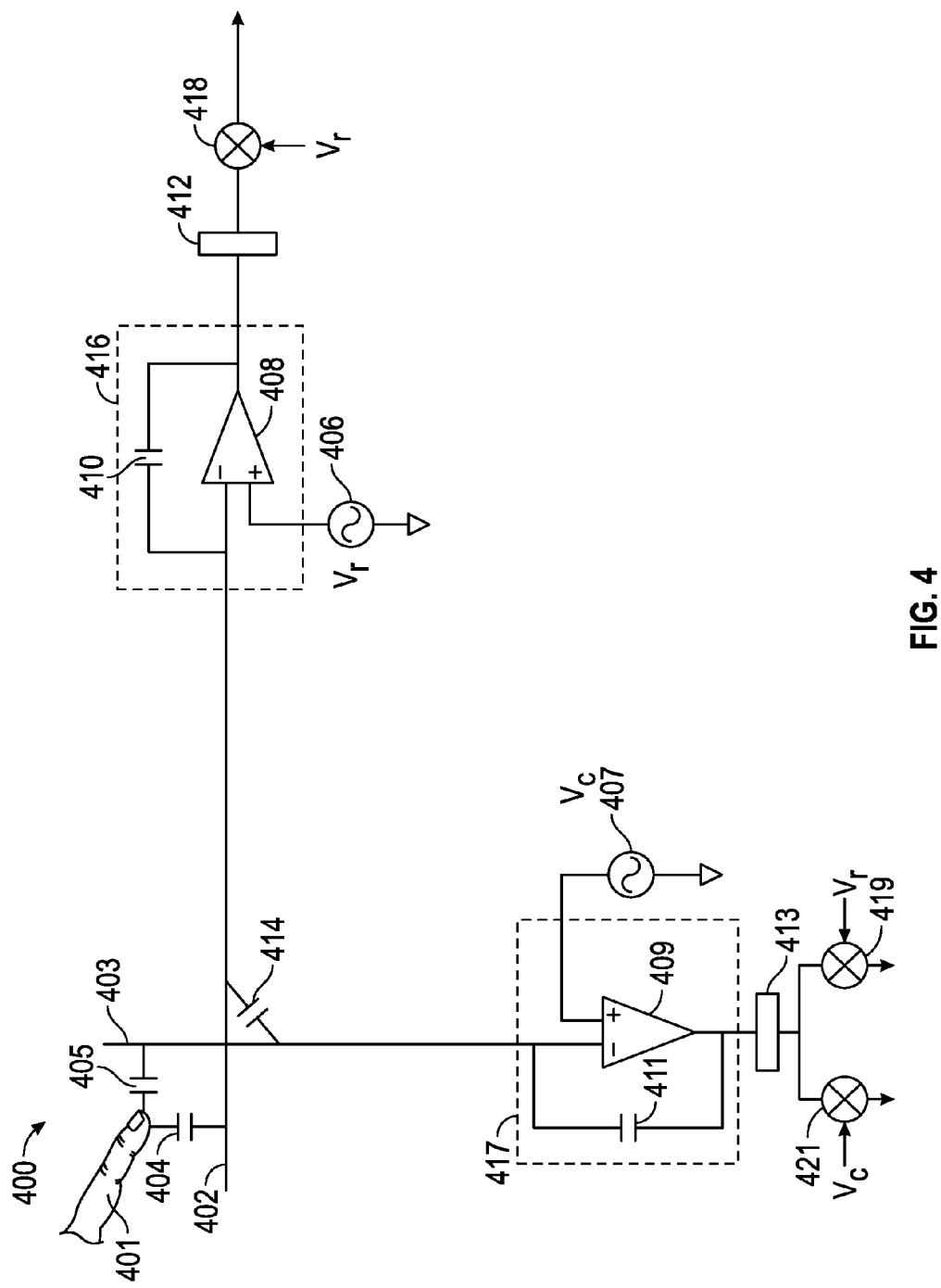
FIG. 4 illustrates an exemplary row and column of a simultaneous mutual and self-capacitance touch sensor panel according to examples of the disclosure.

FIG. 4 illustrates an exemplary row 402 and column 403 of a simultaneous mutual and self-capacitance touch sensor panel 400 according to examples of the disclosure. Row 402 and column 403 can correspond to one row and one column from the touch sensor panels of FIGS. 2 and 3, though it is understood that the discussion that follows can similarly apply to multiple rows and columns that can make up touch sensor panel 400. As discussed above, mutual capacitance 414 can be associated with a touch node created by the intersection of row 402 and column 403.

Row 402 can be coupled to sense circuitry 416. Sense circuitry 416 can include operational amplifier 408, feedback capacitor 410 and AC voltage source 406, although other configurations can be employed. Row 402 can be coupled to the inverting input of operational amplifier 408. AC voltage source 406 can be coupled to the non-inverting input of operational amplifier 408. Sense circuitry 416 can be configured to sense changes in the self-capacitance 404 of row 402 induced by finger or object 401 either touching or in proximity to the row, as described above. The output from sense circuitry 416 can pass through appropriate analog front ends (AFE) and analog-to-digital converters (ADC) 412, and can be used by a processor to determine the presence of a proximity or touch event with respect to row 402; or, the output can be inputted into a discrete logic network to determine the presence of a touch or proximity event. The function and operation of mixer 418 will be described later.

The configuration and operation of column 403 and its associated components (e.g., sense circuitry 417, AFE and ADC 413, mixer 418, etc.) can be similar to the configuration and operation of row 402 and its associated components (e.g., sense circuitry 416, AFE and ADC 412, mixers 419 and 421, etc.); the details will be omitted here for brevity. In some examples, some or all of the components associated with row 402 and/or column 403 can be included on a touch controller.

Simultaneous sensing of mutual capacitance 414 and self-capacitances 404 and 405 on touch sensor panel 400 will now be described. As discussed above, in order to sense the self-capacitance of a self-capacitance sensor, the self-capacitance sensor can be driven by a stimulation signal, and can be sensed. In the illustrated example, self-capacitance 404 of row 402 can be sensed by: 1) driving the row with AC voltage source 406 through operational amplifier 408 with a voltage Vr having a specific frequency and phase, and 2) sensing the self-capacitance using sense circuitry 416. The output of operational amplifier 408 can be demodulated through mixer 418 using a signal having the same frequency and phase as Vr (provided by AC voltage source 406). Because row 402 can be driven by a voltage Vr having the same frequency and phase as the signal used to demodulate the output of operational amplifier 408, demodulation through mixer 418 can provide the self-capacitance information for the row. The self-capacitance 405 of column 403 can be similarly sensed, except that the column can be driven by a voltage Vc (provided by AC voltage source 407) having its own specified frequency and phase, and the output of operational amplifier 409 can be demodulated through mixer 421 using a signal having the same frequency and phase as Vc to provide the self-capacitance information for the column. In this way, self-capacitances 404 and 405 of row 402 and column 403, respectively, can be simultaneously sensed.

Because row 402 can be driven as discussed above during the sensing of self-capacitance 404, there can be an opportunity to sense column 403 (based on the driving of the row) to sense mutual capacitance 414 between the row and the column, much like in mutual capacitance touch sensor panel 200 in FIG. 2. The difference from mutual capacitance touch sensor panel 200 can be that both self-capacitance 405 and mutual capacitance 414 need to be sensed from column 403, instead of just sensing the mutual capacitance. Because sense circuitry 417 can already be sensing column 403 to sense self-capacitance 405, the sense circuitry can simultaneously be used to sense mutual capacitance 414. In such examples, self-capacitance information and mutual capacitance information can both reside in the signal at the output of operational amplifier 409 as a super composition of both the self-capacitance and mutual capacitance information. Thus, it can be necessary to separate the mutual capacitance information from the self-capacitance information. One way to allow for such separation of mutual and self-capacitance information can be to set Vr (from AC voltage source 406) and Vc (from AC voltage source 407) to have orthogonal frequencies, or to have the same frequency but have phases that are 90 degrees apart. By doing this, self-capacitances 404 and 405 of row 402 and column 403 can continue to be sensed, as discussed above. However, information relating to mutual capacitance 414, which can be driven by row 402 with voltage Vr (from AC voltage source 406), can be extracted from the output of operational amplifier 409 by additionally demodulating the output through mixer 419 using a signal having the same frequency and phase as Vr. Additionally, because Vr and Vc can have frequencies that are orthogonal, or phases that are 90 degrees apart, the self-capacitance information sensed on column 403 and the mutual capacitance information sensed on the column can substantially not interfere with each other, and each can be extracted, as described. Although Vr and Vc have been described as having orthogonal frequencies, or having the same frequency but having phases that are 90 degrees apart, it is understood that this need not be the case, and that frequencies other than those described above can be used in the examples of the disclosure.

Thus, the self-capacitances of row 402 and column 403 can be sensed simultaneously with mutual capacitance 414. The operations described above with respect to a single row and a single column can be extended to multiple rows and multiple columns so that self-capacitance and mutual capacitance can be sensed simultaneously across the touch sensor panel. In such examples, each row and each column can have configurations as described above with reference to FIG. 4. Further, in some examples, every column can be driven with a voltage having the same frequency and phase. In some examples, the voltages driving the rows can have frequencies that are orthogonal to the voltages driving the columns, or the voltages driving the rows can have the same frequency as the voltages driving the columns, but can have phases that are 90 degrees apart from the phases of the voltages that are driving the columns Additionally, the voltages driving the rows can have frequencies that are orthogonal to each other, or can have the same frequency but different phases, as can be the case in a Hadamard/Circulant matrix driving scheme (e.g., a simultaneous driving scheme in which the distribution of drive lines (e.g., rows) that receive a positive phase stimulation signal and drive lines that receive a negative phase stimulation signal can be equal for each touch scanning step except a common mode touch scanning step). In examples in which multiple rows of the touch sensor panel are to be driven simultaneously, additional mixers can be added to the output of the sense circuitry for each column (e.g., in addition to mixers 419 and 421 in column 403) to match up with each frequency/phase being used to drive the rows so that individual mutual capacitance information associated with each of the rows can be extracted from the sensed output of each column.

When sensing the self-capacitance of touch sensors (e.g., row 402 and/or column 403), any capacitances other than touch-related capacitances that the touch sensors see can interfere with operation of the touch sensor panel. For example, the touch sensors in a touch sensor panel can form capacitances with parasitic sources ("offset capacitances") in the touch sensor panel such as a display or other electronics proximal to the touch sensors. Addressing the effects of these offset capacitances with some form of offset cancellation can facilitate proper operation of the touch sensor panel.

Figure 5:
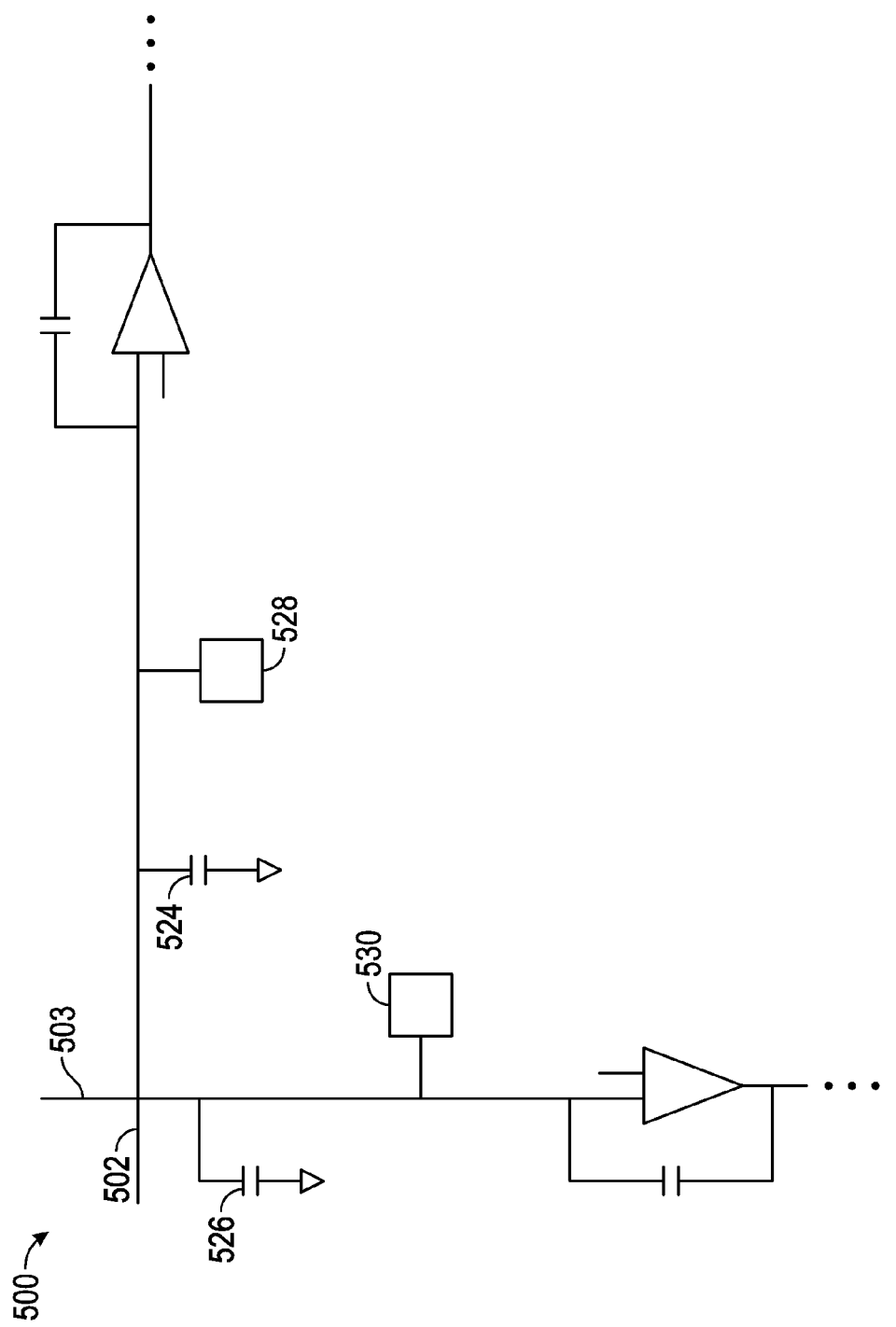
FIG. 5 illustrates an exemplary row and column of a simultaneous mutual and self-capacitance touch sensor panel including offset capacitances according to examples of the disclosure.

FIG. 5 illustrates an exemplary row 502 and column 503 of a simultaneous mutual and self-capacitance touch sensor panel 500 including offset capacitances 524 and 526 according to examples of the disclosure. Touch sensor panel 500 can correspond to touch sensor panel 400 in FIG. 4, except that row 502 can have offset capacitance 524 associated with it, and column 503 can have offset capacitance 526 associated with it. Touch sensor panel 500 can further include offset cancellation circuits 528 and 530. Offset cancellation circuit 528 can be configured to cancel the effects of offset capacitance 524, and offset cancellation circuit 530 can be configured to cancel the effects of offset capacitance 526. The remainder of touch sensor panel 500 can be substantially the same as touch sensor panel 400 in FIG. 4. The effects of offset capacitances 524 and 526, and exemplary operation of offset cancellation circuits 528 and 530, will now be described.

Figure 6:
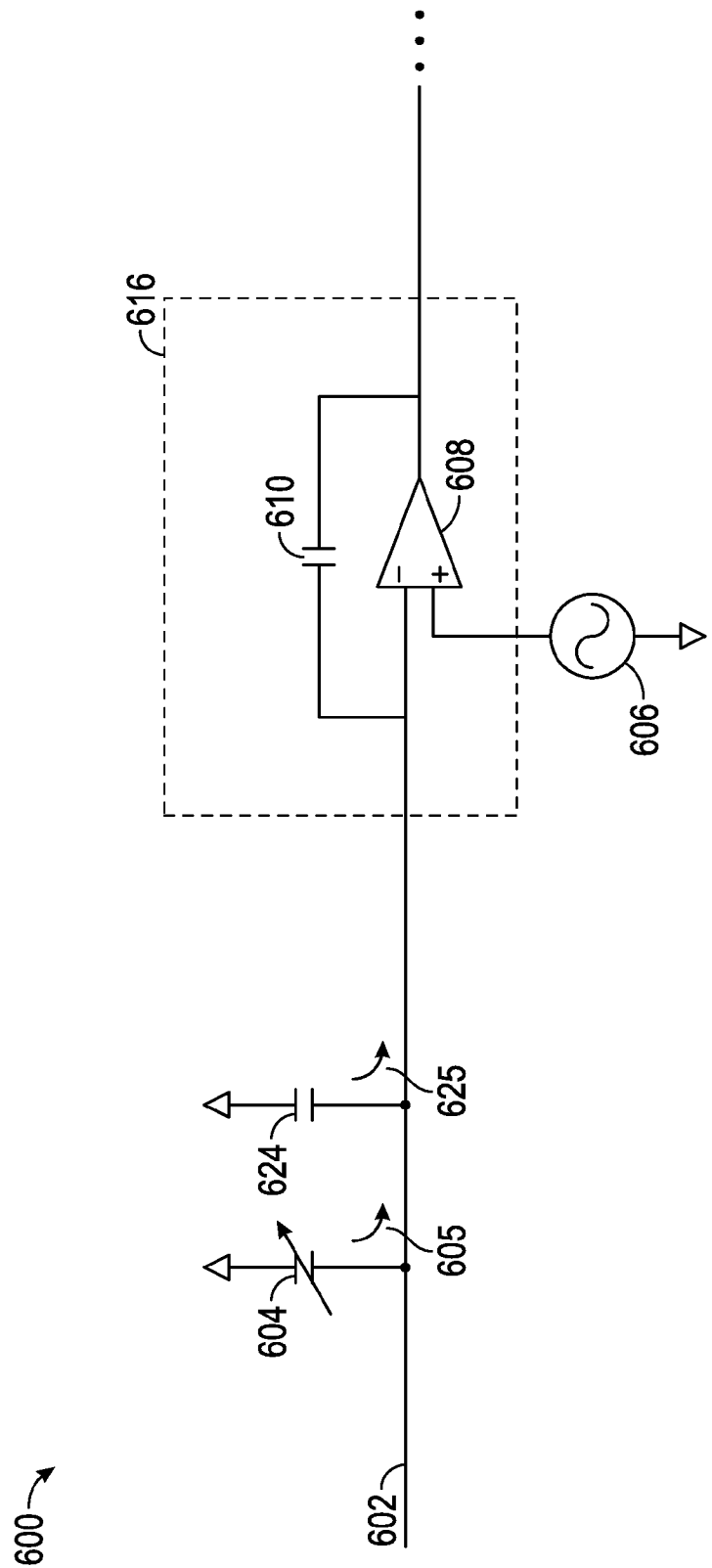
FIG. 6 illustrates an exemplary row of a simultaneous mutual and self-capacitance touch sensor panel according to examples of the disclosure.

FIG. 6 illustrates an exemplary row 602 of a simultaneous mutual and self-capacitance touch sensor panel 600 according to examples of the disclosure. Row 602 can correspond to row 402 in FIG. 4 and/or row 502 in FIG. 5, for example. Additional components that can be coupled to the output of operational amplifier 608 (e.g., AFE and ADC 412, mixer 418, etc.) are not illustrated here for brevity. Row 602 can have a self-capacitance 604 to ground associated with it, changes in which sense circuitry 616 can be configured to sense to detect touch or proximity events, as described above. Row 602 can also have an offset capacitance 624 to ground associated with it, which can be created by parasitic sources such as a display or other electronics proximal to the row. Although the description here is provided with respect to row 602, it is understood that the discussion can also similarly apply to a column in the touch sensor panel (e.g., column 403 in FIG. 4 and/or column 503 in FIG. 5).

As described below, offset capacitance 624 can introduce an offset signal—in this case, offset current 625—into row 602. During touch detection, self-capacitance 604 (and changes in the self-capacitance) can be regarded as the capacitance of interest, while offset capacitance 624 can be regarded as an offset source. During operation of touch sensor panel 600, when a user touches or comes into close proximity to row 602, self-capacitance 604 of the row can be altered. The alteration of self-capacitance 604 of row 602 can result in current 605 to flow towards sense circuitry 616. The flow of current 605 can be detected by sense circuitry 616, and a touch can thus be detected. However, offset capacitances such as offset capacitance 624 can cause offset current 625 to also flow to sense circuitry 616, which can also be detected by the sense circuitry. The presence of offset capacitance 624, and thus offset current 625, can therefore lead to a degradation in the dynamic range of sense circuitry 616, especially if the magnitude of the offset current is equal to or greater than that of touch current 605, making it difficult to identify the existence and/or magnitude of the touch current.

Mitigating or eliminating the effects of offset current 625 can increase the dynamic range of the touch sensor panel according to examples of this disclosure. One method for mitigating or eliminating offset current 625 can be to create an opposite but equal magnitude current flow (i.e., "offset cancellation current") that can cancel the offset current flowing into sense circuitry 616. By creating an opposite but equal (in magnitude) current flow to that of offset current 625, the offset current can essentially be canceled out, thus leaving only touch current 605 to be detected. Elimination or reduction of offset current 625 can result in the offset being minimized while touch current 605 can remain constant, thus maximizing the dynamic range of the system. While the disclosure is presented in terms of offset currents and offset cancellation currents, it is understood that the disclosure is not so limited, and encompasses offset signals and offset cancellation signals other than currents.

Figure 7:
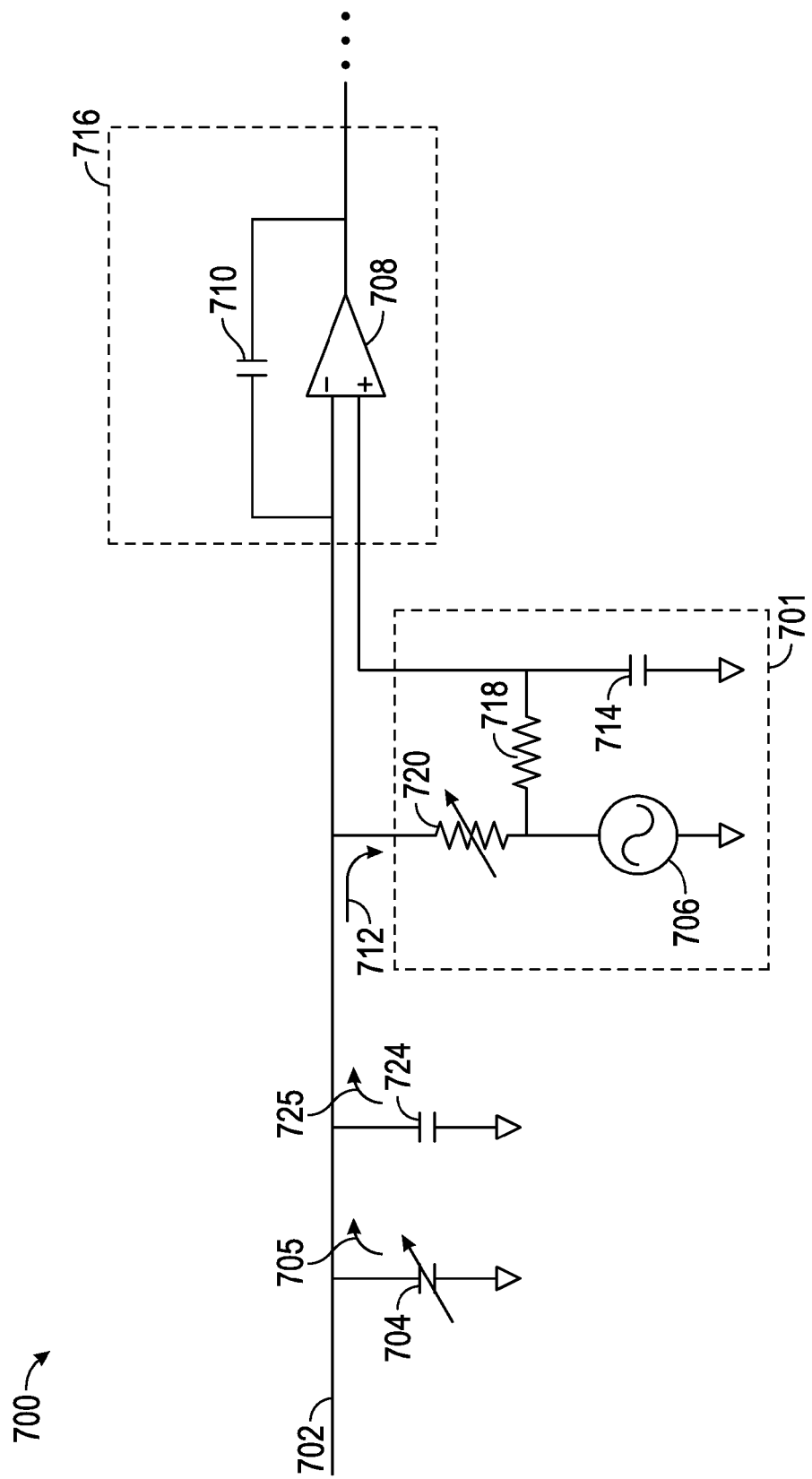
FIG. 7 illustrates an exemplary row of a simultaneous mutual and self-capacitance touch sensor panel with an offset cancellation circuit according to examples of the disclosure.

FIG. 7 illustrates an exemplary row 702 of a simultaneous mutual and self-capacitance touch sensor panel 700 with an offset cancellation circuit 701 according to examples of the disclosure. Row 702 can correspond to row 402 in FIG. 4, row 502 in FIG. 5, and/or row 602 in FIG. 6, except that the row can be coupled to offset cancellation circuit 701. Additional components that can be coupled to the output of operational amplifier 708 (e.g., AFE and ADC 412, mixer 418, etc.) are not illustrated here for brevity. Offset cancellation circuit 701 can include AC voltage source 706, resistor 718, capacitor 714 and variable resistor 720. Whereas before, the non-inverting input of operational amplifier 708 was coupled directly to AC voltage source 706, in the illustrated example, the non-inverting input of the operational amplifier can be coupled to the AC voltage source through the illustrated configuration of offset cancellation circuit 701. The magnitude, frequency and/or phase of AC voltage source 706 can therefore be adjusted accordingly for proper simultaneous mutual and self-capacitance touch sensor panel 700 operation as described previously (e.g., the frequency of the AC voltage source can be set as described previously with respect to AC voltage source 406 in FIG. 4). As will be described in more detail below, variable resistor 720 can be adjusted so that current 712 generated by offset cancellation circuit 701 can equal offset current 725 produced by offset capacitance 724. In this way, offset cancellation circuit 701 can be tuned to essentially cancel offset current 725, thus leaving substantially only touch current 705 generated by touch capacitance 704 to be detected by sense circuitry 716.

If the resistance of variable resistor 720 is $R_S$, the resistance of resistor 718 is $n*R_S$, the capacitance of offset capacitance 724 is $C_{Offset}$, and the capacitance of capacitor 714 is $C_{Offset}/n$, then the transfer function between the output of AC voltage source 706 and the non-inverting input of operational amplifier 708 can be characterized by the following equation:

$$V_s = V_i/(1+S*n*R_S*(C_{Offset}/n)) \quad (1)$$

where $V_i$ corresponds to the voltage at the output of AC voltage source 706, and $V_s$ corresponds to the voltage at the non-inverting input of operational amplifier 708. Offset current 725 can be characterized by:

$$I_{Offset} = V_s*S*C_{Offset} \quad (2)$$

where $I_{Offset}$ corresponds to offset current 725, and $V_s$ corresponds to the voltage at the inverting input of operational amplifier 708, which, due to the characteristics of operational amplifiers, can be substantially the same as the voltage at the non-inverting input of the operational amplifier. Offset cancellation current 712 can therefore be characterized by:

$$I_{RS} = (V_i - V_s)/R_S \quad (3)$$

where $I_{RS}$ corresponds to offset cancellation current 712. Solving equation (1) for $V_i$, and substituting the solution into equation (3) provides that:

$$I_{RS} = V_s*S*C_{Offset} \quad (4)$$

which is the same as $I_{Offset}$ as expressed in equation (2). Thus, by selecting the voltages, capacitances, and/or resistances of offset cancellation circuit 701 as described above, offset current 725 can be essentially canceled by offset cancellation current 712 generated by the offset cancellation circuit.

Although one particular method of offset cancellation has been described, it is understood that any suitable offset cancellation scheme can be utilized in the touch sensor panel of the disclosure. Further, because each row and/or column of the touch sensor panel can include its own offset capacitance, offset cancellation can be applied to each row and/or column of the touch sensor panel, similar to as described above with respect to FIG. 7. In some examples, because the rows of the touch sensor panel may be driven with voltages having different characteristics (e.g., different frequencies, and/or different phases, etc.), each row can have its own associated offset cancellation circuit. In some examples, because the columns of the touch sensor panel may be driven with voltages having the same characteristics (e.g., same frequencies, and/or same phases, etc.), the columns can share some components of a single offset cancellation circuit (e.g., AC voltage source 706, capacitor 714, and resistor 718), but can each have their own associated tuned variable resistor (e.g., variable resistor 720) so that the effect of the offset capacitance of each column, which may vary across the touch sensor panel, can be individually canceled.

Thus, the examples of the disclosure provide one or more configurations for simultaneously sensing mutual capacitance and self-capacitance on a touch sensor panel. Additionally, the examples of the disclosure provide one or more configurations for reducing the effects of offset capacitances on the dynamic range of sensing circuitry in the touch sensor panels of the disclosure, making it easier to detect touch and/or proximity events at the touch sensor panel.

Therefore, according to the above, some examples of the disclosure are directed to a touch controller comprising first sense circuitry configured to be coupled to a first electrode on a touch sensor panel, the first sense circuitry configured to sense: a first self-capacitance associated with the first electrode, and a first mutual capacitance associated with the first electrode. Additionally or alternatively to one or more of the examples disclosed above, in some examples, the first sense circuitry is configured to sense the first self-capacitance and the first mutual capacitance simultaneously. Additionally or alternatively to one or more of the examples disclosed above, in some examples, the touch controller further comprises a first mixer and a second mixer coupled to the first sense circuitry, the first mixer configured to demodulate a first output from the first sense circuitry to extract information about the first self-capacitance from the first output, the second mixer configured to demodulate the first output from the first sense circuitry to extract information about the first mutual capacitance from the first output. Additionally or alternatively to one or more of the examples disclosed above, in some examples, the first sense circuitry is configured to: drive the first electrode with a first signal at a first frequency, sense the first self-capacitance based on the first signal, and sense the first mutual capacitance based on a second signal, the second signal having a second frequency orthogonal to the first frequency, or the second signal having a different phase than the first signal. Additionally or alternatively to one or more of the examples disclosed above, in some examples, the touch controller further comprises: second sense circuitry configured to be coupled to a second electrode on the touch sensor panel, the second sense circuitry configured to: drive the second electrode with the second signal, and sense a second self-capacitance associated with the second electrode based on the second signal, wherein the first mutual capacitance comprises a mutual capacitance between the first electrode and the second electrode. Additionally or alternatively to one or more of the examples disclosed above, in some examples, the first electrode comprises a column electrode, and the second electrode comprises a row electrode orthogonal to the column electrode. Additionally or alternatively to one or more of the examples disclosed above, in some examples, the touch controller further comprises: a first mixer and a second mixer coupled to the first sense circuitry, the first mixer configured to demodulate a first output from the first sense circuitry to extract information about the first self-capacitance from the first output, the second mixer configured to demodulate the first output from the first sense circuitry to extract information about the first mutual capacitance from the first output; and a third mixer coupled to the second sense circuitry, the third mixer configured to demodulate a second output from the second sense circuitry to extract information about the second self-capacitance from the second output. Additionally or alternatively to one or more of the examples disclosed above, in some examples, the touch controller further comprises: third sense circuitry configured to be coupled to a third electrode on the touch sensor panel, the third sense circuitry configured to: drive the third electrode with a third signal, the third signal having a third frequency orthogonal to the first frequency, or the third signal having a different phase than the first signal, and sense a third self-capacitance associated with the third electrode based on the third signal, wherein the first sense circuitry is further configured to sense a second mutual capacitance between the first electrode and the third electrode based on the third signal. Additionally or alternatively to one or more of the examples disclosed above, in some examples, the first electrode is coupled to a first offset cancellation circuit, the first offset cancellation circuit configured to facilitate sensing of the first self-capacitance, and the second electrode is coupled to a second offset cancellation circuit, the second offset cancellation circuit configured to facilitate sensing of the second self-capacitance. Additionally or alternatively to one or more of the examples disclosed above, in some examples, the first electrode is coupled to a first offset cancellation circuit, the first offset cancellation circuit configured to facilitate sensing of the first self-capacitance. Additionally or alternatively to one or more of the examples disclosed above, in some examples, the examples of the disclosure are directed to the touch sensor panel incorporating the touch controller. Additionally or alternatively to one or more of the examples disclosed above, in some examples, the examples of the disclosure are directed to a touch screen incorporating the touch sensor panel.

Some examples of the disclosure are directed to a method for operating a touch controller, the method comprising: sensing, using first sense circuitry, a first self-capacitance associated with a first electrode on a touch sensor panel; and sensing, using the first sense circuitry, a first mutual capacitance associated with the first electrode on the touch sensor panel. Additionally or alternatively to one or more of the examples disclosed above, in some examples, sensing the first self-capacitance and sensing the first mutual capacitance are performed simultaneously. Additionally or alternatively to one or more of the examples disclosed above, in some examples, the method further comprises: demodulating a first output from the first sense circuitry to extract information about the first self-capacitance from the first output; and demodulating the first output from the first sense circuitry to extract information about the first mutual capacitance from the first output. Additionally or alternatively to one or more of the examples disclosed above, in some examples, the method further comprises: driving, using the first sense circuitry, the first electrode with a first signal at a first frequency, wherein: sensing the first self-capacitance is based on the first signal, and sensing the first mutual capacitance is based on a second signal, the second signal having a second frequency orthogonal to the first frequency, or the second signal having a different phase than the first signal. Additionally or alternatively to one or more of the examples disclosed above, in some examples, the method further comprises: driving, using second sense circuitry, a second electrode on the touch sensor panel with the second signal; and sensing, using the second sense circuitry, a second self-capacitance associated with the second electrode based on the second signal, wherein the first mutual capacitance comprises a mutual capacitance between the first electrode and the second electrode. Additionally or alternatively to one or more of the examples disclosed above, in some examples, the first electrode comprises a column electrode, and the second electrode comprises a row electrode orthogonal to the column electrode. Additionally or alternatively to one or more of the examples disclosed above, in some examples, the method further comprises: demodulating a first output from the first sense circuitry to extract information about the first self-capacitance from the first output; demodulating the first output from the first sense circuitry to extract information about the first mutual capacitance from the first output; and demodulating a second output from the second sense circuitry to extract information about the second self-capacitance from the second output. Additionally or alternatively to one or more of the examples disclosed above, in some examples, the method further comprises: driving, using third sense circuitry, a third electrode on the touch sensor panel with a third signal, the third signal having a third frequency orthogonal to the first frequency, or the third signal having a different phase than the first signal; sensing, using the third sense circuitry, a third self-capacitance associated with the third electrode based on the third signal; and sensing, using the first sense circuitry, a second mutual capacitance between the first electrode and the third electrode based on the third signal. Additionally or alternatively to one or more of the examples disclosed above, in some examples, the first electrode is coupled to a first offset cancellation circuit, the first offset cancellation circuit configured to facilitate sensing of the first self-capacitance, and the second electrode is coupled to a second offset cancellation circuit, the second offset cancellation circuit configured to facilitate sensing of the second self-capacitance. Additionally or alternatively to one or more of the examples disclosed above, in some examples, the first electrode is coupled to a first offset cancellation circuit, the first offset cancellation circuit configured to facilitate sensing of the first self-capacitance.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch controller comprising:
   first sense circuitry configured to be coupled to a first column electrode on a touch sensor panel and configured to drive the first electrode with a first signal;
   second sense circuitry configured to be coupled to a first row electrode on the touch sensor and drive the second electrode with a second signal;
   a first mixer and a second mixer coupled in parallel to an output of the first sense circuitry, the first mixer configured to demodulate the output from the first sense circuitry using the first signal to measure a first capacitance from the first output, the second mixer configured to simultaneously demodulate the output from the first sense circuitry using the second signal to measure a second capacitance from the first output, wherein the first signal is different from the second signal; and
   a third mixer coupled to an output of the second sense circuitry, the third mixer configured to demodulate the output from the second sense circuitry using the second signal to measure a third capacitance from the second output simultaneously to the measurement of the first and second capacitance,
   wherein the second capacitance comprises a mutual capacitance between the first electrode and the second electrode.

2. The touch controller of claim 1, wherein the first sense circuitry is configured to sense the first capacitance and the second capacitance simultaneously.

3. The touch controller of claim 1, wherein the first signal is orthogonal to the second signal.

4. The touch controller of claim 1, wherein
   the second signal has a second frequency orthogonal to the first frequency, or the second signal has a different phase than the first signal.

5. The touch controller of claim 1, wherein the first electrode comprises a column electrode, and the second electrode comprises a row electrode orthogonal to the column electrode.

6. The touch controller of claim 1, further comprising:
   third sense circuitry configured to be coupled to a third electrode on the touch sensor panel, the third sense circuitry configured to:
      drive the third electrode with a third signal, the third signal having a third frequency orthogonal to the first frequency, or the third signal having a different phase than the first signal, and
      sense a third self-capacitance associated with the third electrode based on the third signal,
   wherein the first sense circuitry is further configured to sense a second mutual capacitance between the first electrode and the third electrode based on the third signal.

7. The touch controller of claim 1, wherein:
   the first electrode is coupled to a first offset cancellation circuit, the first offset cancellation circuit configured to facilitate sensing of the first self-capacitance, and
   the second electrode is coupled to a second offset cancellation circuit, the second offset cancellation circuit configured to facilitate sensing of the second self-capacitance.

8. The touch controller of claim 1, wherein:
   the first electrode is coupled to a first offset cancellation circuit, the first offset cancellation circuit configured to facilitate sensing of the first self-capacitance.

9. The touch sensor panel incorporating the touch controller of claim 1.

10. A touch screen incorporating the touch sensor panel of claim 9.

11. A method for operating a touch controller, the method comprising:
    driving, using first sense circuitry, a first column electrode on the touch sensor panel with a first signal;
    sensing, using the first sense circuitry, a first output associated with the first electrode on the touch sensor panel;
    driving, using second sense circuitry, a first column electrode on the touch sensor panel with a second signal;
    sensing, using the second sense circuitry, a second output associated with the second electrode;
    demodulating the output from the first sense circuitry at a first demodulator using the first signal to measure a first capacitance from the first output, demodulating the output from the first sense circuitry at a second demodulator using the second signal to measure a second capacitance from the first output, demodulating the output from the second sense circuitry using the second signal to measure a third capacitance from the second output;

wherein the first demodulator and the second demodulator are coupled in parallel to the first output from the first sense circuitry and the second capacitance comprises a mutual capacitance between the first electrode and the second electrode.

12. The method of claim 11, wherein the first signal is orthogonal to the second signal.

13. The method of claim 11, wherein:

the first signal has a first phase and a first frequency; and the second signal has a second frequency orthogonal to the first frequency, or the second signal has a different phase than the first signal.

14. The method of claim 11, wherein the first electrode comprises a column electrode, and the second electrode comprises a row electrode orthogonal to the column electrode.

15. The method of claim 11, further comprising:

driving, using third sense circuitry, a third electrode on the touch sensor panel with a third signal, the third signal having a third frequency orthogonal to the first frequency, or the third signal having a different phase than the first signal;

sensing, using the third sense circuitry, a third self-capacitance associated with the third electrode based on the third signal; and sensing, using the first sense circuitry, a second mutual capacitance between the first electrode and the third electrode based on the third signal.

16. The method of claim 11, wherein:

the first electrode is coupled to a first offset cancellation circuit, the first offset cancellation circuit configured to facilitate sensing of the first capacitance, and the second electrode is coupled to a second offset cancellation circuit, the second offset cancellation circuit configured to facilitate sensing of the third capacitance.

17. The method of claim 11, wherein:

the first electrode is coupled to a first offset cancellation circuit, the first offset cancellation circuit configured to facilitate sensing of the first self-capacitance.

\* \* \* \* \*